US008456731B2

(12) United States Patent
Yang et al.

(10) Patent No.: US 8,456,731 B2
(45) **Date of Patent: *Jun. 4, 2013**

(54) ELECTRO-WETTING DISPLAY DEVICE AND DRIVING METHOD THEREOF

(75) Inventors: Syuan-Ling Yang, Kaohsiung County (TW); Ching-Huan Lin, Hsinchu County (TW); Chu-Yu Liu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 115 days.

This patent is subject to a terminal disclaimer.

(21) Appl. No.: 13/169,047

(22) Filed: Jun. 27, 2011

(65) Prior Publication Data

US 2012/0281269 A1 Nov. 8, 2012

(30) Foreign Application Priority Data

May 5, 2011 (TW) ............................ 100115780 A

(51) Int. Cl.
*G02B 26/00* (2006.01)

(52) U.S. Cl.
USPC .......................................... 359/290; 359/291

(58) Field of Classification Search
USPC ................................................. 359/290, 291
See application file for complete search history.

(56) References Cited

U.S. PATENT DOCUMENTS

| | | | | |
|---|---|---|---|---|
| 7,123,796 | B2 | 10/2006 | Steckl et al. | |
| 2010/0033798 | A1 * | 2/2010 | Wang et al. | 359/290 |

FOREIGN PATENT DOCUMENTS

| | | |
|---|---|---|
| KR | 1020080111658 | 12/2008 |
| TW | 200733441 | 9/2007 |
| TW | 200745795 | 12/2007 |
| TW | 201007321 | 2/2010 |
| WO | 2007064141 | 6/2007 |

OTHER PUBLICATIONS

"First Office Action of China counterpart application" issued on Jun. 29, 2012, p. 1-p. 7, in which the listed references were cited.

J. Heikenfeld et al., "Intense switchable fluorescence in light wave coupled electrowetting devices", Applied Physics Letters 86, 2005, 011105-1~011105-3.

* cited by examiner

*Primary Examiner* — James Jones
(74) *Attorney, Agent, or Firm* — Jianq Chyun IP Office

(57) ABSTRACT

An electro-wetting display device includes a light guide plate having a light incident surface and a light output surface, a light source, a transparent electrode, a dielectric layer, a transparent non-polar solution layer, a counter substrate, a light emitting material layer, a counter electrode layer and a transparent polar solution layer. The light source is disposed near the light incident surface. The transparent electrode layer is disposed on the light output surface. The dielectric layer covers the transparent electrode layer and has refractive index n1. The transparent non-polar solution layer is disposed on the dielectric layer and has refractive index n2, and n2≧n1. The counter substrate is disposed above the transparent non-polar solution layer. The light emitting material layer and the counter electrode are disposed on the counter substrate. The transparent polar solution layer is disposed between the counter substrate and the light guide plate.

16 Claims, 2 Drawing Sheets

ELECTRO-WETTING DISPLAY DEVICE AND DRIVING METHOD THEREOF

CROSS-REFERENCE TO RELATED APPLICATION

This application claims the priority benefit of Taiwan application serial no. 100115780, filed on May 5, 2011. The entirety of the above-mentioned patent application is hereby incorporated by reference herein and made a part of this specification.

BACKGROUND

1. Field of the Invention

The present invention relates to a display device, and more particularly to an electro-wetting display device and driving method thereof.

2. Description of Related Art

With the recent rampant development of electronic papers (E-paper) and electronic books (E-book), a display device with the features of being light, thin, and flexible is being actively pursued. An electro-wetting display device is a type of display panel applicable in E-papers and E-books.

A typical electro-wetting panel includes an upper electrode, a lower electrode, and a water layer and an ink layer in between the two electrodes. When a voltage is not yet applied, the ink layer spreads to cover entirely the pixel unit. Accordingly, the incident light is absorbed by the ink layer and the above-mentioned pixel unit may appear dark. Conversely, if the pixel unit is to be appeared bright, a voltage is applied to the upper and lower electrodes, causing the ink layer to contract to the boarder of the above-mentioned pixel region to expose the reflector layer under the ink layer. Hence, the incident light is reflected by the reflector layer to appear bright. However, the reflectivity of the reflective-type electro-wetting display panel is very low. The display quality of an electro-wetting display panel thereby needs to be improved.

Further, in order for an electro-wetting display panel to display a color image, color dyes are mixed into the ink layer of the electro-wetting display panel. However, the selection of the color dyes is often limited by the solubility thereof in the ink layer. Accordingly, further improvement of a color electro-wetting display panel is required.

SUMMARY OF THE DISCLOSURE

According to the disclosure, an electro-wetting display device is provided, wherein the reflectivity problem of the conventional reflective electro-wetting display may be resolved. Further, the problem of a limited selection of color dyes due to the solubility thereof in the ink layer may also be obviated.

An exemplary embodiment of the disclosure provides an electro-wetting display that includes a light guide plate, a light source, a transparent electrode layer, a dielectric layer, a transparent nonpolar solution layer, a counter substrate, a light emitting material layer, a counter electrode, and a transparent polar solution layer. The light guide plate has a light incident surface and a light output surface. The light source is disposed near the light incident surface of the light guide plate. The transparent electrode is disposed on the light output surface of the light guide plate. The dielectric layer covers the transparent electrode layer, and the refractive index of the dielectric layer is n1. The transparent nonpolar solution layer is disposed on the dielectric layer, wherein the refractive index of the transparent nonpolar solution layer is n2, and n2≧n1. The counter substrate is positioned on the transparent nonpolar solution layer. The light emitting material layer is disposed on the counter substrate. The counter electrode is disposed on the counter substrate. The transparent polar solution layer is positioned between the light guide plate and the counter substrate.

According to the disclosure, the electro-wetting display applies the transmissive technique to resolve the low reflectivity problem of the conventional reflective type electro-wetting display panel. Moreover, according to the electro-wetting display of the disclosure, the light emitting material layer is disposed on the counter substrate. Alternatively, the light emitting material of the electro-wetting display of the disclosure is not dissolved in a solution layer. The problem of a limited selection of the dye materials due to the solubility thereof in the ink layer as in the conventional electro-wetting display panel can be obviated.

Reference will now be made in detail to the present exemplary embodiments of the invention, examples of which are illustrated in the accompanying drawings.

DESCRIPTION OF EMBODIMENTS

Figure 1:
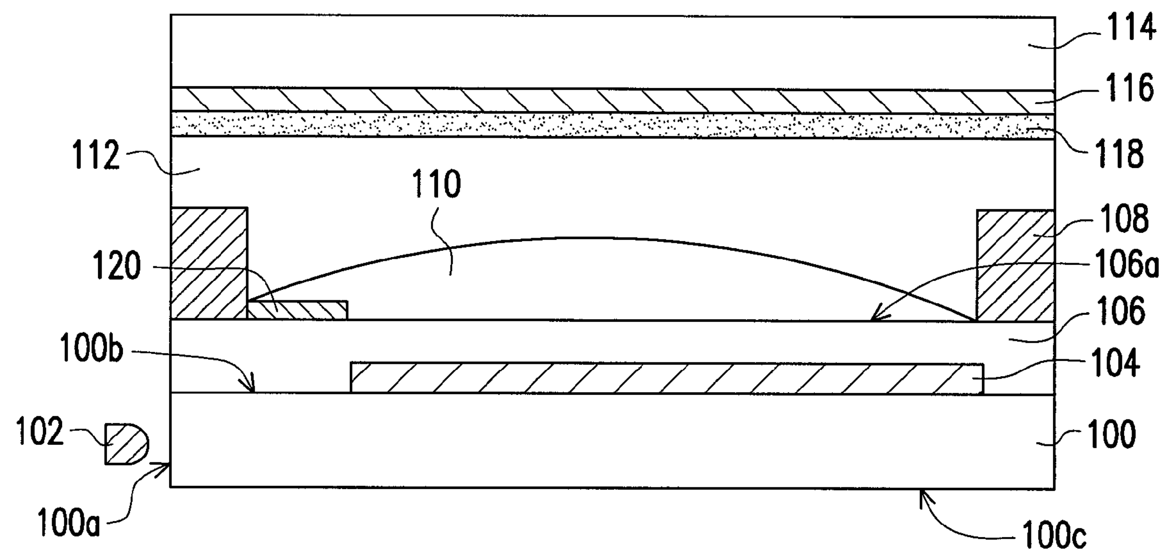
FIG. 1 is a schematic, partial cross-sectional view diagram of an electro-wetting display according an exemplary embodiment of the disclosure.

FIG. 1 is a schematic, partial cross-sectional view diagram of an electro-wetting display according an exemplary embodiment of the disclosure. Referring to FIG. 1, the electro-wetting display of an exemplary embodiment includes a light guide plate 100, a light source 102, a transparent electrode layer 104, a dielectric layer 106, and transparent nonpolar solution layer 110, a counter substrate 114, a light-emitting material layer 118, a counter electrode 116, and a transparent solution layer 112. Moreover, the electro-wetting display of an exemplary embodiment further includes a hydrophilic wall structure 108 and a light-shielding pattern 120. It is worthy to notice that the structure illustrated in FIG. 1 is one of the pixel unit structures of the electro-wetting display. Generally speaking, the electro-wetting display is constructed with a plurality of pixel units arranged in an array. One of ordinary skilled in the art would realize the entire structure of the electro-wetting display of the current exemplary embodiment according to the illustration in FIG. 1 and the following disclosure.

The light guide plate 100 includes a light-incident surface 100*a* and a light output surface 100*b*. The light guide plate 100 may be a rigid light guide plate or a flexible light guide plate. According to an exemplary embodiment, the light guide plate 100 may be a transparent plastic substrate that includes poly(methyl methacrylate) (PMMA) or poly(ethylene terephthalate) (PET). If the light guide plate 100 is a flexible light guide plate, the electro-wetting display is fabricated by the roll to roll process. Moreover, optical microstructure or optical film (not shown) may be disposed on the bottom surface 100*c* of the light guide plate 100 for the light of the light source to be guided to the light-emitting surface 100*b*. Moreover, the light guide plate 100, asides from the purpose of guiding light, may concurrently serve to carry the display device.

The light source 102 is in the proximity of the light-incident surface 100*a* of the light guide plate 100. According to an exemplary embodiment, the light source 102 may emit lights of ultraviolet wavelength. The light source 102 may be a light tube, a light emitting diode, or other types of light source. Moreover, the light source 102 may be in direct contact with the light output surface 100*a* of the light guide plate 100, or may maintain a specific distance from the light output surface 100*a* of the light guide plate 100.

The transparent electrode layer 104 is disposed on the light-emitting surface 100*b* of the light guide plate 100. According to an exemplary embodiment, if the electro-wetting display is a passive display, the transparent electrode layer 104 may be simply a passive electrode pattern. According to another exemplary embodiment, if the electro-wetting display is an active display, the transparent electrode layer 104, in addition to an electrode pattern, may further include an active device that is electrically connected with the electrode pattern. Moreover, the material of the above transparent electrode layer 104 may include a metal oxide material, such as indium titanium oxide (ITO), indium zinc oxide (IZO), aluminum tin oxide, aluminum zinc oxide, indium germanium zinc oxide, other appropriate oxide materials, or a stack layer of the at least two of the above materials.

The dielectric layer 106 covers the transparent electrode layer 104, and the refractive index of the dielectric layer 106 is n1. The material of the dielectric layer 106 may include silicon nitride, silicon oxynitride, silicon oxide, or other appropriate materials, for example. According to an exemplary embodiment, the surface 106*a* of the dielectric layer 106 is, for example, a hydrophobic surface. In an embodiment, hydrophobic surface 106*a* of the dielectric layer 106 is formed by performing a hydrophobic treatment on the surface 106*a* of the dielectric layer 106. According to other embodiments, the hydrophobic surface 106*a* of the dielectric layer 106 may also be provided by, for example, performing a coating process, a plating process, or a deposition process directly on the dielectric layer 160 to form a hydrophobic layer on the dielectric layer 106.

Moreover, in the exemplary embodiment, a hydrophilic wall 108 is also disposed on the dielectric layer 106. More specifically, the hydrophilic wall 108 is disposed on the dielectric layer 106 to define a plurality of unit regions on the dielectric layer 106. The above-mentioned unit region is a pixel unit of the electro-wetting display. Accordingly, if the electro-wetting display of the current exemplary embodiment is an active display, the transparent electrode layer 104 within the unit region defined by the hydrophilic wall 108 at least includes an active device and an electrode pattern.

Additionally, in this exemplary embodiment, the dielectric layer further includes a light-shielding pattern layer 120 disposed thereon. The light-shielding layer 120 is disposed at the border of the hydrophilic wall 108. More preferably, the light-shielding pattern 120 and the transparent electrode 104 do not overlapped. However, the invention is not limited as such. Alternatively speaking, according to other exemplary embodiments, the light-shielding pattern layer 120 may overlap with the transparent electrode layer 104. The light-shielding pattern layer 120 may dispose at one side, two sides or four sides, etc. of the unit region defined by the hydrophilic wall 108. Further, the material of the light-shielding pattern layer 120 may include black resin, or other light shielding or light absorbing materials.

The transparent non-polar solution layer 110 is positioned on the dielectric layer 106. More specifically, the transparent non-polar solution layer 110 is positioned on the dielectric layer 106 and within the space fenced off or enclosed by the hydrophilic wall 108. In other words, the major function of the hydrophilic wall 108 is to prevent the non-polar solution layer 110 to flow to other unit regions (pixel unit). Moreover, the refractive index of the transparent nonpolar solution layer 110 is n2, and the refractive index of the nonpolar solution layer 110 being n2 is greater than or equal to the refractive index n1 of the dielectric layer 106. Further, the refractive index n2 of the transparent nonpolar solution layer 110 and the refractive index n1 of the dielectric layer 106 are not significantly different, for example the difference between the refractive index n1 of the dielectric layer 106 and the refractive index n2 of the transparent nonpolar solution layer 110 is about 0.1 to 1.

According to the exemplary embodiment of the disclosure, the material of the dielectric layer 106 includes silicon nitride, silicon oxynitride, silicon oxide, or other appropriate materials. Therefore, the transparent nonpolar solution layer 110 may be selected from silicon oil, alkane oil, solvent-containing silicon oil mixture, solvent-containing alkane oil mixture, or other appropriate transparent nonpolar solutions. The above examples of transparent nonpolar solution layer are used for explaining the invention and not for limiting the scope of the invention. In other exemplary embodiments, the dielectric layer 106 and the transparent nonpolar solution layer 110 may be selected from other materials, so long as the transparent nonpolar solution layer 110 is provided with a refractive index n2 greater than the refractive index n1 of the dielectric layer 106, for example, the difference between the refractive index n1 of the dielectric layer 106 and the refractive index n2 of the transparent nonpolar solution layer 110 is about 0.1 to 1.

The counter substrate 114 is disposed opposite to the light guide plate 100 and on the transparent nonpolar solution layer 110. The counter substrate 114 may be a rigid substrate or a flexible substrate, and the material thereof may include glass, quartz, organic polymer, other appropriate materials according to the exemplary embodiment. The counter substrate 114 mainly serves to carry or support the film layer or the lines.

The light emitting material layer 118 and the counter electrode 116 are disposed on the counter substrate 114. Accordingly to an exemplary embodiment, the counter electrode 116 is disposed on the counter substrate 114, and the light emitting material layer 118 is disposed on the counter electrode 116. The invention is not limited as such. In other exemplary embodiments, the light emitting material layer 118, for example, is disposed on the counter substrate 114, and the counter electrode 116 is disposed on the light emitting material layer 118.

The light emitting material layer 118 includes fluorescent material or phosphorous material. More specifically, the light emitting material layer 118 may include color fluorescent material or color phosphorous material, such as red fluorescent material, blue fluorescent material, green fluorescent material, red phosphorous material, blue phosphorous material, or green phosphorous material. In other words, when the light emitting material layer 118 is irradiated by light of specific wavelength (for example, UV light), the light may excite the light emitting material layer 118 to emit visible light of a specific wave band (for example, red light, blue light or green light). Moreover, the material of the counter electrode 116 includes metal oxide, such as indium titanium oxide (ITO), indium zinc oxide (IZO), aluminum tin oxide, aluminum zinc oxide, indium germanium zinc oxide, other appropriate oxide materials, or a stack layer of the at least two of the above materials.

Furthermore, the transparent polar solution layer 112 is disposed between the light guide plate 100 and the counter electrode 114. More specifically, the transparent polar solution layer 112 fills the space between the dielectric layer 106 and the light emitting material layer 118 (or counter electrode 116). The transparent polar solution layer 112 may flow between each pixel unit of the display. The transparent polar solution layer 112 may be water or other polar solution. According to an exemplary embodiment, the refractive index of the transparent polar solution layer 112 is n3, and the difference between the refractive index n3 of the transparent polar solution layer 112 and the refractive index n1 of the dielectric layer 106 is 0.5 to 1.5.

Figure 2:
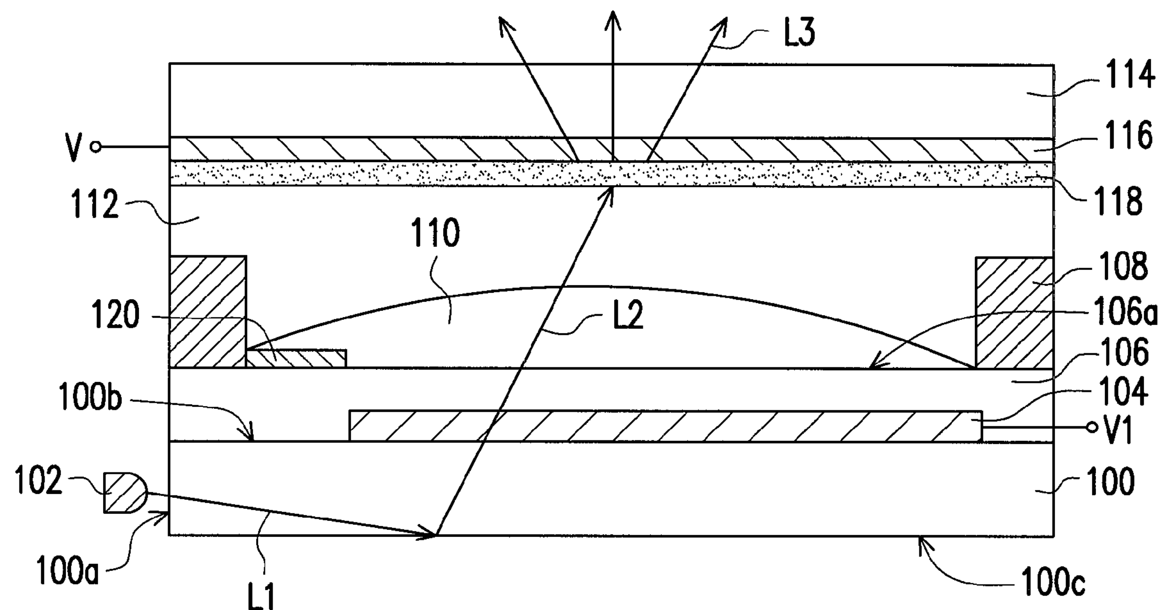
FIGS. 2 and 3 are schematic views illustrating the driving of the electro-wetting display according an exemplary embodiment of the disclosure.
Figure 3:
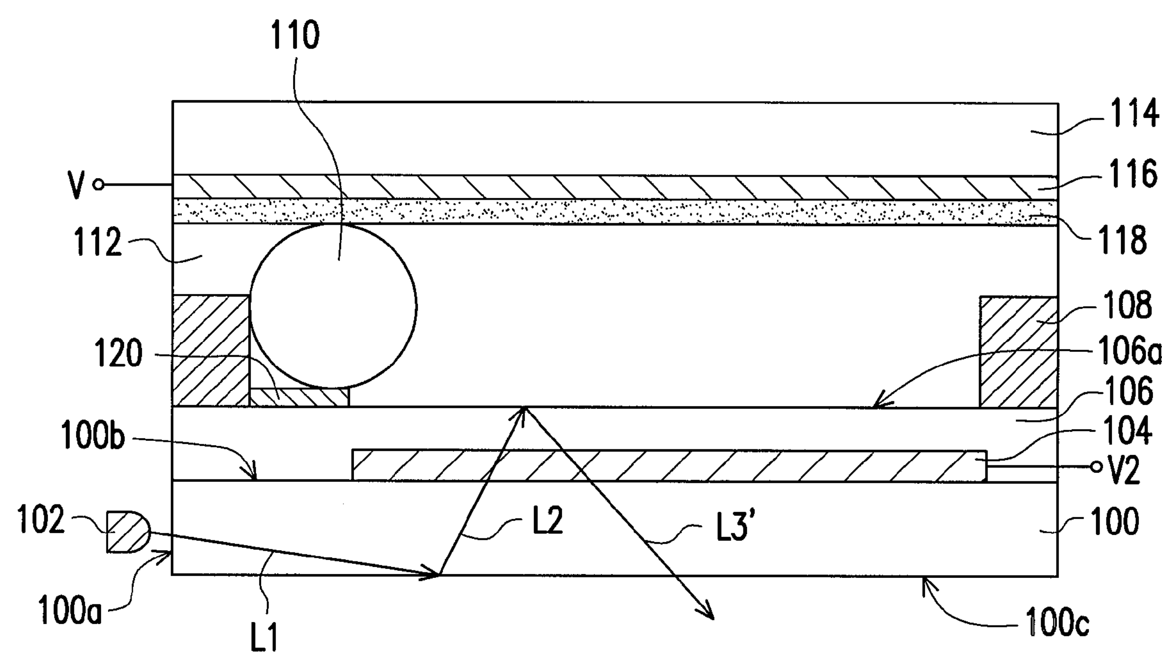

The following disclosure is directed to the driving method of the electro-wetting display of FIG. 1. FIGS. 2 and 3 are schematic views illustrating the driving of the electro-wetting display according an exemplary embodiment of the disclosure. Referring to FIG. 2, for the pixel unit of the electro-wetting display to be driven to generate a color light, a first voltage V1 is applied to the transparent electrode layer so as to make the transparent nonpolar solution layer 110 covering the dielectric layer 106. For example, if the counter electrode 116 on the counter substrate 114 is applied with a common voltage V, the voltage value of the first voltage V1 is the same as that of the common voltage (V). An electric field is not generated between the transparent electrode layer 104 and the counter electrode 116. Accordingly, the transparent nonpolar solution layer 110 covers entirely the hydrophobic surface 106*a* of the dielectric layer 106 within the hydrophilic wall 118.

After the light L1 (for example, a UV light) generated by the light source 102 is incident into the light guide plate 100 through the incident surface 100*a* of the light guide plate 100, the light L2 (for example, a UV light) is emitted from the light output surface 100*b* of the light guide plate 100 due to the disposition of the optical microstructure or the optical film in the light guide plate 100. The light L2 then passes through the transparent electrode layer 104, the dielectric layer 106, the transparent nonpolar solution layer 110, and the transparent polar solution layer 112, and is emitted to the light emitting material layer 118. Thereafter, the light L2 (for example, an ultraviolet light) may excites the light emitting material layer 118 to emit a visible light L3 (for example, red light, blue light, or green light) of a specific wavelength. Further, the user is able to perceive the above-mentioned color light L3 when viewing from the top of the counter substrate 114.

It is worthy to notice that when no electric field is generated between the transparent electrode layer 104 and the counter electrode 116, the transparent nonpolar solution layer 110 covers entirely the hydrophobic surface 106*a* of the dielectric layer 106. The light L2 is emitted to the light emitting material layer 118 through a direct penetration or refraction, due the small difference between the refractive index n2 of the transparent nonpolar solution layer 110 and the refractive index n1 of the dielectric layer, when the light L2 passes through of the interface between the dielectric layer 106 and the transparent nonpolar solution layer 110. Accordingly, the light L2 reaches the light emitting material layer 118 to excite the light emitting material layer 118 to emit the visible light L3 (for example, red light, blue light or green light) of a specific wavelength.

Referring to FIG. 3, for the pixel unit of the electro-wetting display to be driven to present a dark or black state, a second voltage (V2) is applied to the transparent electrode layer 104 for the transparent nonpolar solution layer 110 to expose the dielectric layer 106. Similarly, if a common voltage (V) is applied to the counter electrode 116 on the counter substrate 114, the voltage value of second voltage (V2) is not equal to that of the common voltage (V) to generate an electric field between the transparent electrode layer 104 and the counter electrode 116. More specifically, when an electric field is generated between the transparent electrode layer 104 and the counter electrode 116, the transparent nonpolar solution layer 110 contracts to the hydrophilic wall 108 (the boarder of the unit region), and the dielectric layer 106 is exposed.

The light L1 generated by the light source is incident into the light guide plate 100 from the light incident surface 100*a* of the light guide plate 100, and the light L2 (for example, ultraviolet light) is emitted from the light output surface 100*b* of the light guide plate 100 due to the disposition of the optical microstructure or optical film of the light guide plate 100. Thereafter, the light L2 is totally reflected when it arrives to the interface between the dielectric layer 106 and the transparent polar solution layer 112 through the transparent conductive layer 104, and the light L3' does not irradiate to the light emitting material layer 118. Accordingly, the user is unable to perceive the light L3 when viewing from the top of the substrate 114, and the pixel unit therefore presents a dark or black state.

It is worthy to note that since the refractive index n3 of the transparent electrode solution layer 112 of the exemplary embodiment of the disclosure is lower than the refractive index n1 of the dielectric layer 106. The light L2, when passes through the interface between the dielectric layer 106 and the transparent polar solution layer 112, is reflected as much as possible. The light L3' does not reach to light emitting material layer 118 for the pixel unit to appear dark or black.

Accordingly, the electro-wetting display of an exemplary embodiment of the disclosure applies the transmissive technique and relies on the difference in the refractive index between the transparent nonpolar solution layer and the dielectric layer and the difference in the refractive index between the transparent polar solution layer and the dielectric layer so as to drive the pixel unit of the electro-wetting display to generate a color light or present a dark or black state. Hence, the electro-wetting display of the invention may obviate the problem of low reflectivity confronted by the conventional reflective electro-wetting display panel.

Moreover, the light emitting material layer of the electro-wetting display of the invention is disposed on the counter substrate, and the light from the light source excites the light emitting material to generate a color light. Alternatively speaking, the light emitting material of the electro-wetting display of the invention is not dissolved in the solution layer. Accordingly, the problem that the selection of the dye materials being limited by the solubility thereof in the ink layer as in the conventional electro-wetting display is obviated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electro-wetting display, comprising:

a light guide plate having a light incident surface and a light output surface;

a light source, in proximity to the light incident surface of the light guide plate;

a transparent electrode layer, disposed on the light output surface of the light guide plate;

a dielectric layer, covering the transparent electrode layer, wherein a refractive index of the dielectric layer is n1;

a transparent nonpolar solution layer, disposed on the dielectric layer, wherein a refractive index of the transparent nonpolar is n2, and n2≧n1;

a counter substrate, disposed on the transparent nonpolar solution layer;

a light emitting material layer, disposed on the counter substrate;

a counter electrode, disposed on the counter substrate; and a transparent polar solution layer, disposed between the light guide plate and the counter substrate, wherein the difference between the refractive index of the dielectric layer n1 and the refractive index of the transparent nonpolar n2 is about 0.1 to 1.

2. The electro-wetting display of claim 1, wherein a refractive index of the transparent polar solution layer is n3, and n3<n1.

3. The electro-wetting display of claim 2, wherein the difference between the refractive index of the transparent polar solution layer ne3 and the refractive index of the dielectric layer n1 is about 0.5 to 1.5.

4. The electro-wetting display of claim 1, wherein the transparent nonpolar solution layer comprises silicon oil, alkane oil, a solvent-containing silicon oil mixture, or a solvent-containing alkane oil mixture.

5. The electro-wetting display of claim 1, wherein the dielectric layer comprises silicon nitride, silicon oxynitride, or silicon oxide.

6. The electro-wetting display of claim 1, wherein a surface of the dielectric layer is a hydrophobic surface.

7. The electro-wetting display of claim 1, wherein the light emitting material layer comprises a fluorescent material or a phosphorous material.

8. The electro-wetting display of claim 1, wherein the light source is an ultraviolet light source.

9. The electro-wetting display of claim 1 further comprising a light blocking pattern layer, disposed on the dielectric layer.

10. The electro-wetting display of claim 9, wherein the light blocking layer and the transparent electrode layer are not overlapped.

11. The electro-wetting display of claim 1 further comprising a hydrophilic wall disposed on the dielectric layer, wherein the transparent nonpolar solution layer is disposed at a space enclosed by the hydrophilic wall.

12. An electro-wetting display driving method, the method comprising:

providing an electro-wetting display as in claim 1;

generating a light by the light source so that the light is incident into the light guide plate through the light incident surface and is emitted from light output surface;

applying a first voltage to the transparent electrode layer to cause the transparent nonpolar solution layer to cover the dielectric layer, wherein the light emitting from the light output surface of the light guide plate is irradiated to the light emitting material layer through the transparent electrode layer, the transparent nonpolar solution layer, and the transparent polar solution layer to excite the light emitting material to emit a color light; and applying a second voltage to the transparent electrode layer to cause the transparent nonpolar solution layer to expose the dielectric layer, wherein the light emitted from the light output surface of the light guide plate is totally reflected at a surface of the dielectric layer.

13. The electro-wetting display driving method of claim 12, wherein a voltage is applied to the counter electrode, which is the same as the first voltage.

14. The electro-wetting display driving method of claim 12, wherein a voltage is applied to the counter electrode, which is different from the second voltage.

15. An electro-wetting display, comprising:

a light guide plate having a light incident surface and a light output surface;

a light source, in proximity to the light incident surface of the light guide plate;

a transparent electrode layer, disposed on the light output surface of the light guide plate;

a dielectric layer, covering the transparent electrode layer, wherein a refractive index of the dielectric layer is n1;

a transparent nonpolar solution layer, disposed on the dielectric layer, wherein a refractive index of the transparent nonpolar is n2, and n2≧n1;

a counter substrate, disposed on the transparent nonpolar solution layer;

a light emitting material layer, disposed on the counter substrate;

a counter electrode, disposed on the counter substrate; and a transparent polar solution layer, disposed between the light guide plate and the counter substrate, wherein a refractive index of the transparent polar solution layer is n3, and n3<n1.

16. The electro-wetting display of claim 15, wherein the difference between the refractive index of the transparent polar solution layer n3 and the refractive index of the dielectric layer n1 is about 0.5 to 1.5.

* * * * *